April 30, 1935.    M. OSNOS    1,999,473

TEMPERATURE REGULATING SYSTEM

Filed Jan. 28, 1932

INVENTOR
MENDEL OSNOS
BY
ATTORNEY

Patented Apr. 30, 1935

1,999,473

UNITED STATES PATENT OFFICE 1,999,473

TEMPERATURE REGULATING SYSTEM

Mendel Osnos, Berlin, Germany, assignor to Telefunken Gesellschaft für Drahtlose Telegraphie m. b. H., Berlin, Germany, a corporation of Germany Application January 28, 1932, Serial No. 589,446
In Germany February 7, 1931

12 Claims. (Cl. 236—1)

Temperature regulating systems known in the prior art comprise a medium or space which throughout must present constant or practically constant temperature. This constancy of temperature in many instances is obtainable only with great difficulty.

Contradistinct to the prior art, the temperature regulating system of the present invention comprises a medium, say, a liquid which presents dissimilar temperatures at different points so that the body whose temperature is to be stabilized is brought in the particular position inside the medium that has the desired temperature. Fundamentally speaking the temperatures of the different points of said medium need not be constant, in fact, it suffices if among a great number of points of or inside the medium there is one place whose temperature equals the temperature that is desired.

Another feature of the invention is that the body whose temperature is to be kept constant adjusts itself automatically in position so as to occupy a point inside the medium where the desired temperature prevails.

Several embodiments of this invention are illustrated in the accompanying drawing, in which Fig. 1 is a sectional view of a temperature regulating system having an adjustable regulator;

Figure 1:
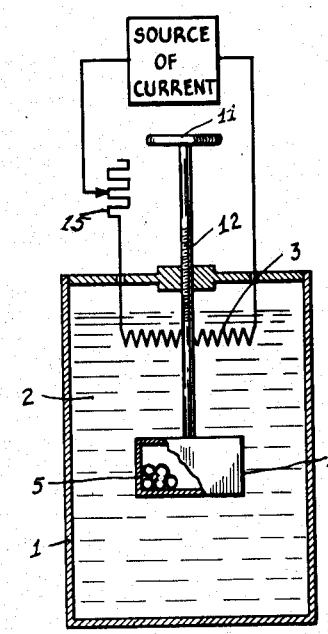

Referring to the drawing, 1 denotes a tank, 2 a liquid contained therein, such as transformer oil, and 3 is a heating resistor disposed most conveniently in the top stratum of the liquid. In this case the temperature levels are automatically or spontaneously adjusted so that there is a temperature drop from the top in downward direction. Inside the liquid medium there is a container 4 with contents 5 which latter is to be submitted to the effect of the constant temperature of the temperature regulating system. By the aid of a suitable regulator device, say, a wheel or circular knob 11 at the top end of the spindle 12 carrying the container 4 whose male screw thread cooperates with the female screw of a fixed support 13, it is possible to set the position of the container inside any desired temperature stratum. Instead of a variation of the position of container 4, or else simultaneously therewith, the temperature of a portion of the medium directly surrounding the container can be varied also by regulation of the heating resistance 3 by an external rheostat 15.

Figure 2:
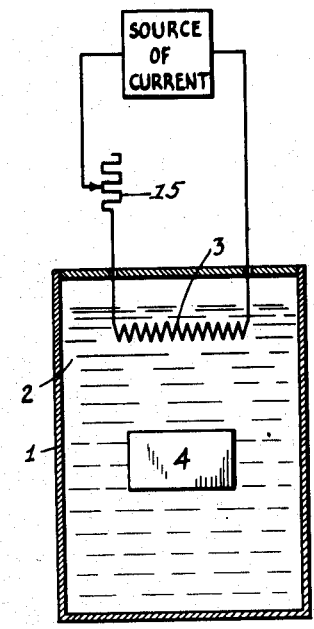
Fig. 2 is a sectional view of another modification of a temperature regulating system having a freely moving floater.

Any desired temperature of the container 4 can also be maintained automatically if the same is designed like a freely moving floater (Figure 2) having the same specific gravity as that of the ambient medium, at the desired temperature, so that it will spontaneously adjust itself to the immersion level corresponding to the temperature that is required. What is meant here by specific gravity of the floater is the relation between its aggregate weight (including the parts contained in the interior thereof or supported thereby) and its displaced volume. If such a floater was just positioned and equilibrated at the level inside the liquid where the desired temperature prevailed, upon the arising of a change in temperature relations inside the medium it will always adjust itself spontaneously at that level of the liquid where the said normal temperature prevails.

Figure 3:
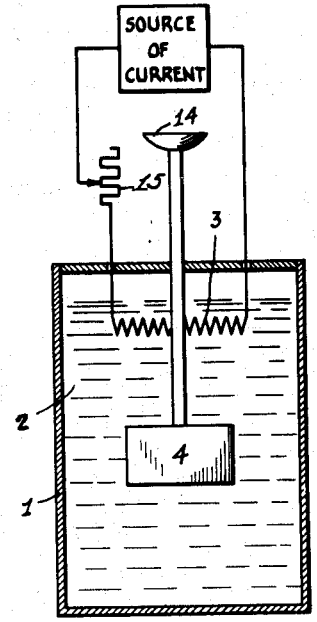
Fig. 3 is a sectional view of another modification of a temperature regulating system having a freely movable floater and an adjustable regulator.

It is most suitable to choose as such a medium a liquid whose specific gravity varies as markedly as feasible in dependence upon the temperature. This is true, for instance, of such mineral oils which are generally employed as transformer oils. The constituents of the container, on the contrary, should be of a material whose temperature coefficient is as low as possible. If the container is a freely mobile floater its exact adjustment to a definite level can be insured, e. g., also by variation in weight. This may be effected, for example, from the outside by the change in the amount of filling of a cup 14 (Figure 3) carried by the floater. The cup 14 when arranged in this manner acts as an equalizer weight to govern the level of the floater 4.

Under certain circumstances it may be recommendable to provide efficient heat insulation for the tank 1 in which the container and its contents are enclosed by building it, for instance, like a thermos bottle since in that case, in order to maintain a mean temperature of the liquid, only very little heating energy is required.

Under certain circumstances it may be suitable to make arrangements so that between the object whose temperature is to be stabilized and the medium which is to stabilize such temperature, the fall of temperature is made as small as feasible. For this purpose the object is laid upon a plate or slab possessing satisfactory heating conductivity and which is in direct contact with the medium. It may also be suitable under certain circumstances to dispose the object to be stabilized in vacuo; for this purpose the container 4 must be hermetically closable.

Figure 4:
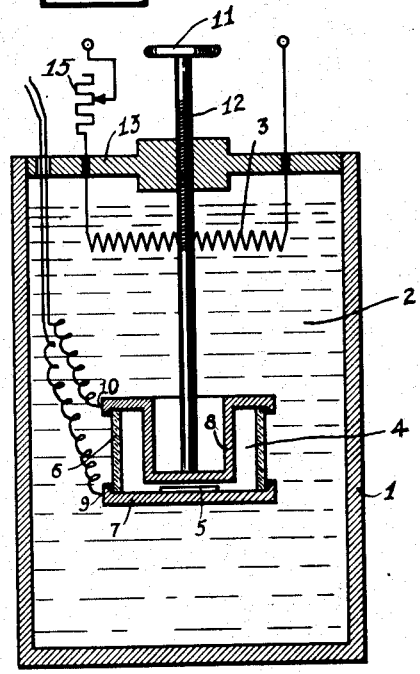
Fig. 4 is a sectional view of an embodiment of this invention, similar to Fig. 1, applied to a piezoelectric crystal and holder.
Figure 5:
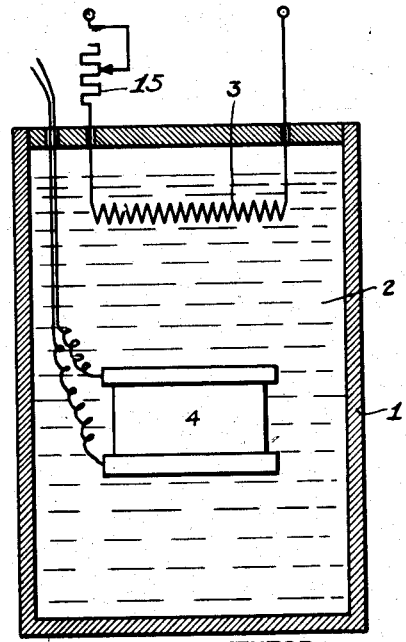
Fig. 5 is a sectional view of another embodiment of this invention similar to Fig. 2, applied to a piezo-electric crystal and holder.

Figures 4 and 5 show this invention as applied to a piezo-electric crystal and holder. In this manner a very accurate adjustment of the natural frequency of crystals is obtainable if in accordance with the desired natural period, the temperature of the medium or ambient surrounding the crystal holder directly is regulated.

Referring to Figure 4, inside the liquid medium 2 is the crystal holder 4 of the type disclosed in my copending application Serial No. 589,445, filed January 28, 1932, containing the crystal 5. The crystal holder 4 most suitably consists of a hermetically closed evacuated vessel (for instance, an insulation cylinder 6 with two metallic covers 7 and 8 serving at the same time as electrodes). 9 and 10 denote flexible current supply leads. By the aid of a suitable regulator device, say, a rotary knob or grip 11 at the top end of the spindle 12 supporting the crystal holder (the male screw of which spindle coacts with the female screw thread of a firm support 13), the crystal holder may be adjusted to any desired level and temperature. Instead of, or else simultaneously with, a variation of the position of the crystal holder, it is also feasible to vary the temperature of a portion of the medium directly surrounding the crystal holder by regulation or variation of a heater resistance.

A definite desired temperature of the crystal could also be automatically maintained by designing the crystal holders as a freely mobile floater (Figure 5) whose specific gravity is equal to the specific gravity of the medium surrounding the same at the desired temperature of the crystal, so that the same will spontaneously or automatically adjust itself to the immersion level corresponding to the desired temperature. If a floater of the said sort happened to be in a state of balance in the particular level or height of the liquid where a temperature prevails that corresponds to the desired natural period of the crystal, then, upon any possibly arising change of the temperature conditions inside the medium it will always spontaneously assume a position inside those strata of the liquid where the said normal temperature prevails.

The invention is applicable advantageously both in transmitters for the precise adjustment of the wave-length as well as in receivers for insuring high selectivity.

It is moreover advantageous to so design the crystal holder that the crystal electrodes constitute a substantial part of the surface of the crystal holder in order that the temperature fall between the medium surrounding the crystal and that surrounding the crystal holder may be vanishingly small.

I claim:

1. In combination in a temperature regulating system, a container, a floating body whose temperature is to be regulated, a fluid surrounding said body and in contact therewith and with said container, a heating element to heat said fluid, and adjustable means to change the position of said body within said container.

2. In combination in a temperature regulating system, a container, a fluid of predetermined specific gravity within said container, means to heat said fluid, and a body, whose temperature is to be regulated, of substantially the same specific gravity as said fluid within said container and surrounded by said fluid.

3. In combination in a temperature regulating system, a container, oil within said container, a heating element to heat said oil so that there are several temperature strata therein, a floating body whose temperature is to be regulated located within said container and in contact with said oil, and adjustable means to change the position of said body from any one stratum of oil to another.

4. A temperature regulating system comprising a container, a liquid medium within said container, a floating body located within said medium whose temperature is to be regulated, heating means for maintaining different temperature levels in said liquid, said means comprising a heating unit within said container and an external source to supply energy to said heating unit.

5. A temperature regulating system comprising a container, a liquid medium within said container, a floating body located within said medium whose temperature is to be regulated, electrical heating means for maintaining different temperature levels in said liquid, said means comprising an electrical heating unit within said container and an external source of current to supply energy to said heating unit, an external variable resistance to alter the regulating temperature.

6. A temperature regulating system comprising a container, a liquid medium within said container, a floating body located within said medium whose temperature is to be regulated, heating means for maintaining different temperature levels in said liquid, said means comprising a heating unit within said container, heating means for maintaining different temperature levels, said floating body having a specific gravity substantially equal to the ambient liquid medium so that the floating body will adjust itself to the immersion level corresponding to the desired temperature, and an external source to supply energy to said heating unit.

7. A temperature regulating system comprising a container containing mineral oil whose temperature fluctuates pronouncedly with changes in temperature within the container, a floating body located within said oil whose temperature is to be regulated, heating means for maintaining different temperature levels in said oil, said means comprising a heating unit within said container and an external source to supply energy to said heating unit.

8. A temperature regulating system comprising a container, a liquid medium within said container, a floating body having a wall of material of high thermal conductivity, having a specific gravity substantially equal to the ambient liquid medium so that the floating body will adjust itself to the immersion level corresponding to the desired temperature, said means comprising a heating unit within said container and an external source to supply energy to said heating unit.

9. A temperature regulating system comprising a container having a threaded aperture in the upper portion thereof, a liquid medium within said container, a floating body located within said medium whose temperature is to be regulated, a rod extended up from said floating body and passing through the threaded aperture in the said upper portion of the container, heating means for maintaining different temperature levels in said liquid, said means comprising a heating unit within said container, and an external source to supply energy to said heating unit.

10. A temperature regulating system comprising a container having an aperture in the upper portion thereof, a liquid medium within said container, a floating body located within said medium whose temperature is to be regulated, a rod extended up from said floating body and passing through the aperture in the said upper portion of the container, heating means for maintaining different temperature levels in said liquid, said means comprising a heating unit within said container, and an external source to supply energy to said heating unit.

11. A temperature regulating system comprising a container having an aperture in the upper portion thereof, a liquid medium within said container, a floating body containing a piezo-electric crystal located within said medium whose temperature is to be regulated, a rod extended up from said floating body and passing through the aperture in the said upper portion of the container, heating means for maintaining different temperature levels in said liquid, said means comprising a heating unit within said container, and an external source to supply energy to said heating unit.

12. In combination a temperature regulating system, a container, a floating body whose temperature is to be regulated, a fluid surrounding said body and in contact therewith and with said container, a heating element to change the temperature of said fluid, and adjustable means to change the position of said body within said container.

MENDEL OSNOS.